US010870443B2

(12) United States Patent
Takahashi et al.

(10) Patent No.: US 10,870,443 B2
(45) Date of Patent: *Dec. 22, 2020

(54) SHOCK ABSORBING STEERING DEVICE

(71) Applicant: YAMADA MANUFACTURING CO., LTD., Kiryu (JP)

(72) Inventors: Ryosuke Takahashi, Kiryu (JP); Koji Hirooka, Kiryu (JP)

(73) Assignee: YAMADA MANUFACTURING CO., LTD., Kiryu (JP)

( * ) Notice: Subject to any disclaimer, the term of this patent is extended or adjusted under 35 U.S.C. 154(b) by 119 days.

This patent is subject to a terminal disclaimer.

(21) Appl. No.: 16/206,185

(22) Filed: Nov. 30, 2018

(65) Prior Publication Data

US 2019/0185045 A1    Jun. 20, 2019

(30) Foreign Application Priority Data

Dec. 18, 2017  (JP) ................................. 2017-242071

(51) Int. Cl.
  *B62D 1/19*      (2006.01)
  *F16F 7/12*      (2006.01)
  (Continued)

(52) U.S. Cl.
  CPC ............. *B62D 1/192* (2013.01); *B62D 1/184* (2013.01); *B62D 1/195* (2013.01); *F16C 3/03* (2013.01); *F16F 7/125* (2013.01); *F16C 2326/24* (2013.01)

(58) Field of Classification Search
  CPC .......... B62D 1/184; B62D 1/19; B62D 1/192; B62D 1/195; F16C 2326/24; F16C 3/03; F16F 7/125
  See application file for complete search history.

(56) References Cited

U.S. PATENT DOCUMENTS 5,769,454 A * 6/1998 Duval .................... B62D 1/197
                                                280/777
6,378,903 B1 * 4/2002 Yabutsuka ............. B62D 1/195
                                                188/371
(Continued)

FOREIGN PATENT DOCUMENTS

JP      2002059853 A  *  2/2002  ............. B62D 1/195
JP      2011207450 A  * 10/2011
              (Continued)

*Primary Examiner* — Laura Freedman
(74) *Attorney, Agent, or Firm* — McGinn IP Law Group, PLLC (57) ABSTRACT

A steering device, a hanger bracket having a first suspended plate-like portion and a second suspended plate-like portion and fixed firmly to a column pipe, an outer column having an enclosing main body portion enclosing the column pipe and a tightening portion, a fixed bracket supporting the outer column, and a tightening tool that tightens and loosens the outer column and the fixed bracket and has a bolt shaft. Long hole portions that extend in the axial direction and are each formed of a telescopic long hole and a shock absorbing long hole are formed in the first suspended plate-like portion and the second suspended plate-like portion respectively. A telescopic stopper is provided in at least either one of the long hole portions. An inclined region including a plurality of consecutive inclined sides and the vertical size of which gradually becomes narrow is provided in the other long hole portion.

7 Claims, 9 Drawing Sheets (51) Int. Cl.
*B62D 1/184* (2006.01)
*F16C 3/03* (2006.01)

(56) References Cited

U.S. PATENT DOCUMENTS

| | | | | |
|---|---|---|---|---|
| 6,659,504 B2 * | 12/2003 | Riefe | ............... | B62D 1/184 |
| | | | | 280/775 |
| 7,401,814 B2 * | 7/2008 | Yasuhara | ............... | B62D 1/195 |
| | | | | 280/775 |
| 7,703,804 B2 * | 4/2010 | Cymbal | ............... | B62D 1/195 |
| | | | | 280/775 |
| 8,899,128 B2 * | 12/2014 | Maniwa | ............... | B62D 1/184 |
| | | | | 280/775 |
| 9,187,116 B2 * | 11/2015 | Yokota | ............... | B62D 1/192 |
| 9,540,031 B2 * | 1/2017 | Tagaya | ............... | B62D 1/184 |
| 9,789,897 B2 * | 10/2017 | Yamamoto | ............... | B62D 1/192 |
| 10,501,110 B2 * | 12/2019 | Osawa | ............... | B62D 1/184 |
| 10,507,862 B2 * | 12/2019 | Abe | ............... | B62D 1/184 |

FOREIGN PATENT DOCUMENTS

| | | | | |
|---|---|---|---|---|
| JP | 2017-036037 A | | | 2/2017 |
| JP | 2017035999 A | * | | 2/2017 |
| JP | 2017154716 A | * | | 9/2017 |
| JP | 2018062213 A | * | | 4/2018 |
| JP | 2018154312 A | * | | 10/2018 |
| JP | 2018184064 A | * | | 11/2018 |

* cited by examiner

Fig.2A

ENLARGED VIEW ALONG ARROW Y3-Y3

WIDTH DIRECTION

SHOCK ABSORBING STEERING DEVICE

BACKGROUND OF THE INVENTION

1. Field of the Invention

The present invention relates to a steering device that has a telescopic adjustment mechanism and a shock absorbing mechanism for secondary collision, and is capable of realizing setting of a shock absorption load with an extremely simple configuration.

2. Description of the Related Art

There exist conventionally various types of steering devices that have a telescopic adjustment mechanism and a shock absorber for protecting the driver in a secondary collision in a crash. There also exists a typical structure of this type of steering device in which the column moves along an axial long hole against the pressing force of the bolt shaft at the time of a secondary collision. In such configuration, mainly at the time of a secondary collision, the column moves as the rim portion of the axial long hole is squished by the bolt shaft.

SUMMARY OF THE INVENTION

Japanese Patent Application Laid-open No. 2017-36037 discloses a steering device that gradually increases the shock absorption load generated during the second half of a secondary collision, by causing the bolt shaft to collapse the protruding plate piece functioning as a telescopic stopper and thereafter collapse an inclined side formed in the shock absorbing long hole. The applicants of the present invention have previously created the invention of Japanese Patent Application Laid-open No. 2017-36037. With this invention, the applicants have achieved easy setting of the shock absorption load of a secondary collision at a requested shock absorption load, thereby accomplishing even better shock absorption.

The present invention was contrived with further development, to even better enable setting of the shock absorption state in a secondary collision at a more specifically requested shock absorption state. An object of the present invention, therefore, is to provide a steering device capable of not only performing more detailed shock absorption setting, but also adjusting the shock absorption load of a secondary collision with an extremely simple configuration, as well as absorbing shocks under various circumstances.

Having conducted diligent research to achieve the foregoing object, the inventors have created the present invention, a first embodiment of which is a steering device, having: a column pipe; a hanger bracket having a first suspended plate-like portion and a second suspended plate-like portion and fixed firmly to the column pipe; an outer column having an enclosing main body portion enclosing the column pipe and a tightening portion; a fixed bracket supporting the outer column; and a tightening tool that tightens and loosens the outer column and the fixed bracket and has a bolt shaft collapsing a telescopic stopper at the time of a secondary collision, wherein long hole portions that extend in an axial direction and are each formed of a telescopic long hole and a shock absorbing long hole are formed in the first suspended plate-like portion and the second suspended plate-like portion respectively, the telescopic stopper is provided in at least either one of the long hole portions, an inclined region which is formed of a plurality of consecutive inclined sides and a vertical size of which gradually becomes narrow is provided in the other long hole portion, and a starting point of the inclined region is located at the front side with respect to the telescopic stopper.

The inventors have achieved the foregoing object by creating a second embodiment of the present invention, which, according to the steering device of the first embodiment, is a steering device in which the inclined region has a first inclined side and a second inclined side located at the rear side with respect to the first inclined side, the first inclined side having an inclination angle larger than that of the second inclined side.

The inventors have achieved the foregoing object by creating a third embodiment of the present invention, which, according to the steering device of the first embodiment, is a steering device in which the inclined region has a first inclined side and a second inclined side located at the rear side with respect to the first inclined side, the second inclined side having an inclination angle larger than that of the first inclined side.

The inventors have achieved the foregoing object by creating a fourth embodiment of the present invention, which, according to the steering device of the first embodiment, is a steering device in which the inclined region has a first inclined side, a second inclined side located at the rear side with respect to the first inclined side, and a third inclined side located at the rear side with respect to the second inclined side, the first inclined side, the second inclined side, and the third inclined side having angles different from one another.

The inventors have achieved the foregoing object by creating a fifth embodiment of the present invention, which, according to the steering device of the fourth embodiment, is a steering device in which the second inclined side has the largest angle and the third inclined side is set to have the smallest angle. The inventors have achieved the foregoing object by creating a sixth embodiment of the present invention, which, according to the steering device of the first or second embodiment, is a steering device in which the inclined regions are formed in the first suspended plate-like portion and the second suspended plate-like portion respectively.

The present invention achieves the following effects with a configuration in which the telescopic stopper is formed in at least either one of the long hole portions of the first suspended plate-like portion and the second suspended plate-like portion of the hanger bracket, the inclined region which is formed of the plurality of consecutive inclined sides and the vertical size of which gradually becomes narrow is provided in the other long hole portion, and the starting point of the inclined region is located at the front side with respect to the telescopic stopper.

At the time of a secondary collision, the bolt shaft of the tightening tool first comes into abutment with the telescopic stopper and collapses the telescopic stopper by pushing down the telescopic stopper. Since the starting point of the inclined region is located at the front side with respect to the telescopic stopper, the bolt shaft starts to come into abutment with the inclined region in the process of collapsing the telescopic stopper. Thereafter, the bolt shaft moves relatively toward the rear side while collapsing the inclined region.

Accordingly, a collapsing load of the inclined region can be generated in the process of collapsing the telescopic stopper, and the shock absorption load of a secondary collision can be sustained. Furthermore, the inclined region is formed of the plurality of consecutive inclined sides. By providing the plurality of inclined sides with inclination angles different from one another, the resistance load that is generated when the bolt shaft collapses the telescopic stopper can be changed. Consequently, the shock absorption load of the secondary collision can be adjusted.

BRIEF DESCRIPTION OF THE DRAWINGS

FIGS. 4A-I, 4A-II, 4B-I, and 4B-II are each a side view showing the hanger bracket, the bolt shaft, the first suspended plate-like portion, and the second suspended plate-like portion in the first half of the collapsing process by the bolt shaft;

FIGS. 5C-I, 5C-II, 5D-I, and 5D-II are each a side view showing the hanger bracket, the bolt shaft, the first suspended plate-like portion, and the second suspended plate-like portion in the second half of the collapsing process by the bolt shaft;

DESCRIPTION OF THE PREFERRED EMBODIMENT

Figure 1A:
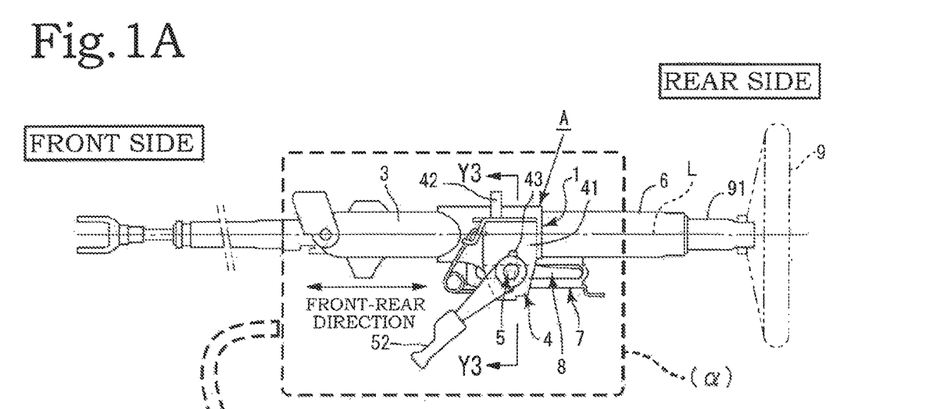
FIG. 1A is a side view of the first embodiment of the present invention.

Embodiments of the present invention are now described hereinafter with reference to the drawings. The directions described in the present invention include "front side" and "rear side". These terms "front side" and "rear side" are based on the front-rear direction of an automobile equipped with the steering device of the present invention. Specifically, in the components of the steering device, the front wheel side of the automobile means the front side, and the handle (steering wheel) 9 side of the automobile means the rear side (see FIG. 1A).

As shown in FIGS. 1A to 1D, the present invention is mainly formed of an outer column A, a fixed bracket 4, a tightening tool 5, a column pipe 6, a hanger bracket 7, long hole portions 8, and the like. Furthermore, a steering shaft 91 is accommodated in the column pipe 6. The outer column A is formed of an enclosing main body portion 1 and a tightening portion 2. The enclosing main body portion 1 is formed in a substantially cylindrical shape which is hollow inside. Specifically, the enclosing main body portion 1 has, on the inside thereof, an enclosing inner peripheral side surface portion 1a constituting the hollow shape (see FIG. 1A and FIGS. 2A and 2B). Slit portions 11 are formed in a diametrically lower portion of the enclosing main body portion 1.

The slit portions 11 are the parts extending from the front side to the rear side in the axial direction of the enclosing main body portion 1 and are separated from each other in the width direction in a non-consecutive manner. The diameter of the enclosing inner peripheral side surface portion 1a becomes small as the rim portions of the slit portions 11 that face each other in the width direction come close to each other, thereby tightening and locking (fixing) the column pipe 6 accommodated and mounted in the enclosing main body portion 1.

In the unlocked state, the enclosing inner peripheral side surface portion 1a of the enclosing main body portion 1 is formed to be slightly larger than the outer diameter of the column pipe 6 so that the column pipe 6 can slide easily. Furthermore, the enclosing main body portion 1 is formed to be long enough to be able to appropriately axially support substantially the middle section of the column pipe 6 in the axial direction thereof. The column pipe 6 is configured to protrude from a front end portion and a rear end portion of the enclosing main body portion 1 in the axial direction thereof.

Figure 2A:
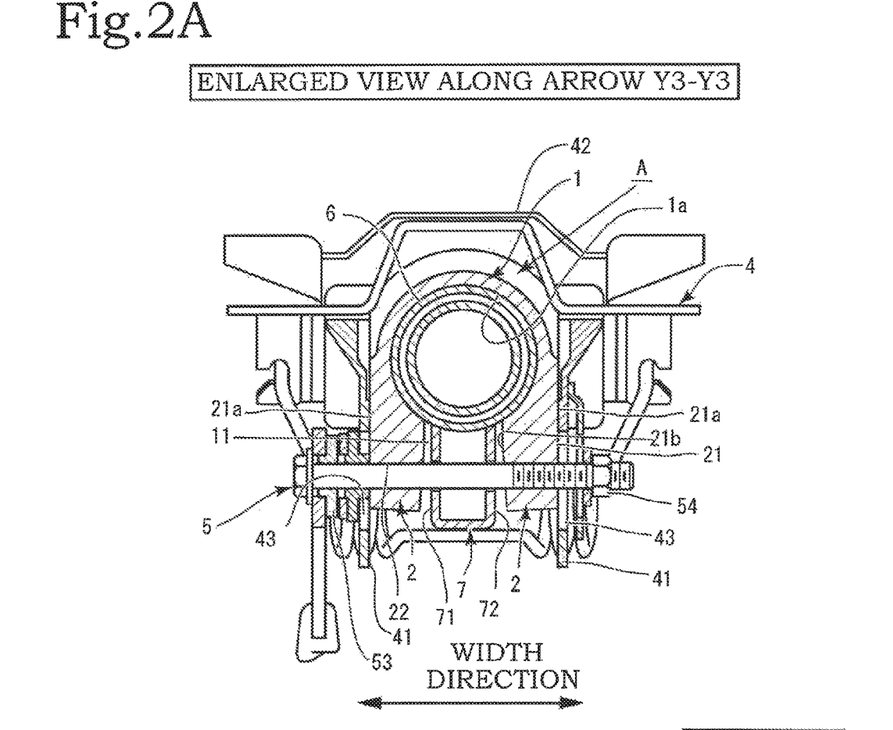
FIG. 2A is an enlarged cross-sectional view taken along arrow Y3-Y3 of FIG. 1A.
Figure 2B:
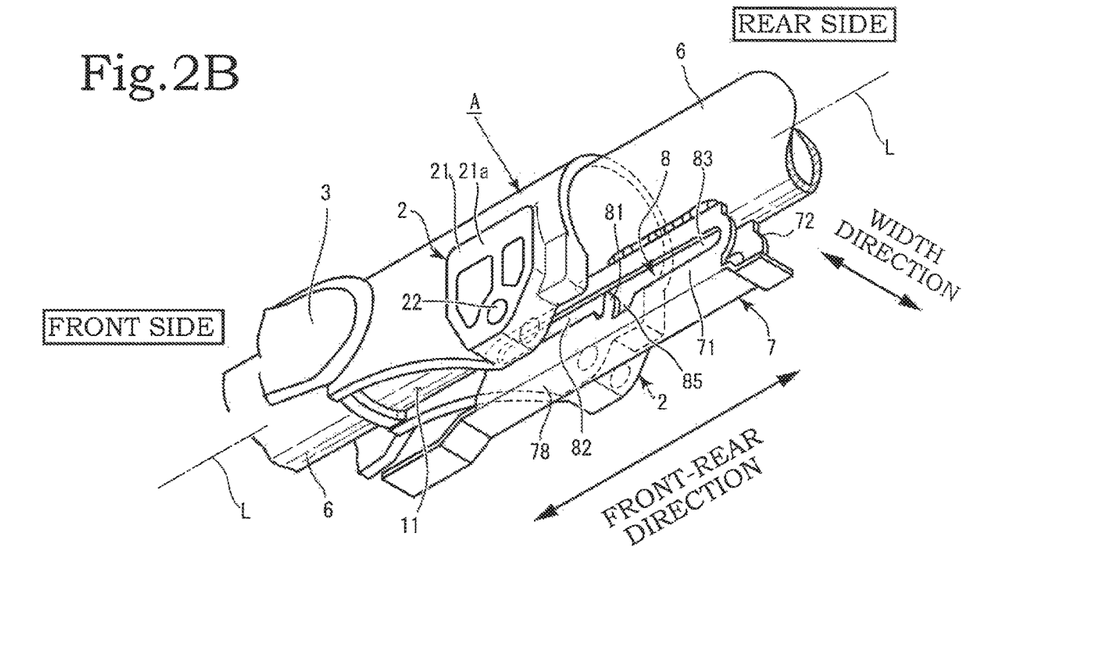
FIG. 2B is a perspective view showing part of the column pipe, the hanger bracket, and the outer column.

Tightening portions 2, 2 are integrally formed in a lower portion of the outer column A (see FIGS. 2A and 2B). The tightening portions 2, 2 are symmetrical and integrally formed at the respective ends of the slit portions 11 in the width direction. Specifically, the tightening portions 2, 2 are thick plate-like parts that are formed in such a manner as to roughly hang downward from the ends of the slit portions 11 in the width direction or the vicinity thereof.

In addition, the tightening portions 2 are each in the shape of a vertical plate at the axially front side of the enclosing main body portion 1. Also, the tightening portions 2 are each in the shape of a block at the axially rear side and have a plate thickness reaching the respective ends of the enclosing main body portion 1 in the horizontal diameter direction thereof. At the axially rear side of the tightening portions 2, the size of each tightening portion 2 in the width direction may be formed to be slightly larger than the diameter of an outer periphery of the enclosing main body portion 1.

Outer surfaces of the respective tightening portions 2, 2 are referred to as outer side surfaces 21a. Inner surfaces of the respective tightening portions 2, 2 that face each other are referred to as inner side surfaces 21b. The outer side surfaces 21a are flat. With the tightening portions 2, 2 being sandwiched between fixed side portions 41, 41 of the fixed bracket 4 described hereinafter, the fixed side portions 41 and the outer side surfaces 21a can come into contact with each other. Tightening through-holes 22, 22 are formed on the respective tightening portions 2, 2 along a direction perpendicular to the axial direction of the outer column A and parallel to the horizontal diameter direction of the enclosing main body portion 1. An arm portion 3 is formed at the front side of the enclosing main body portion 1 in the front-rear direction thereof.

Next, the fixed bracket 4 is formed of the fixed side portions 41, 41 formed at the respective ends in the width direction and an attachment top portion 42. Adjustment holes 43 and 43, which are long holes extending in substantially the vertical or lengthwise direction, are formed in the fixed side portions 41 and 41 (see FIGS. 1A and 2A). The tightening tool 5 is formed of a bolt shaft 51, a lock lever portion 52, a tightening cam 53, and a nut 54 (see FIG. 2A).

The tightening tool 5 is mounted together with the lock lever portion 52 and the tightening cam 53 by the nut 54. The column pipe 6 is internally equipped with a middle section of the steering shaft, and the steering wheel (handle) 9 is mounted on a tip of the steering shaft that protrudes from the rear side of the column pipe 6.

Next, the hanger bracket 7 is formed of a first suspended plate-like portion 71, a second suspended plate-like portion 72, and a bottom plate portion 78 (see FIGS. 1A to 1D, 2A and 2B and the like). The first suspended plate-like portion 71 and the second suspended plate-like portion 72 extend along the axial direction of the column pipe 6 and are disposed diametrically below the column pipe 6 so as to be parallel to each other with a predetermined gap therebetween. Upper ends of the first suspended plate-like portion 71 and the second suspended plate-like portion 72 are fixed firmly to the column pipe 6 (see FIGS. 1C, 2A, 2B).

Figure 1B:
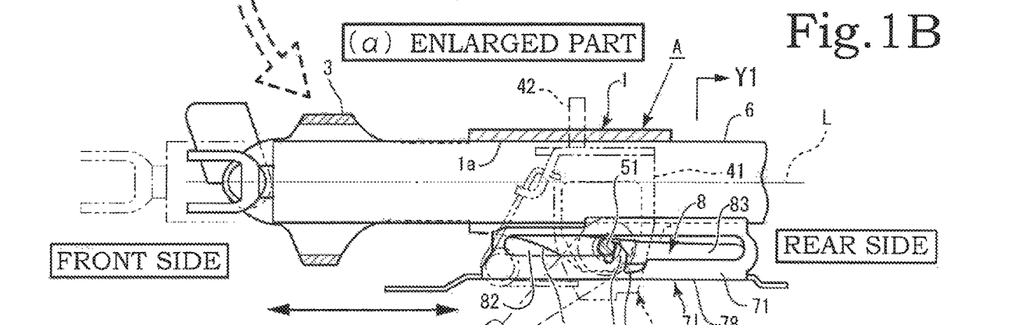
FIG. 1B is an enlarged view of a partial cross section of part (α) shown in FIG. 1A.
Figures 1C, 1D:
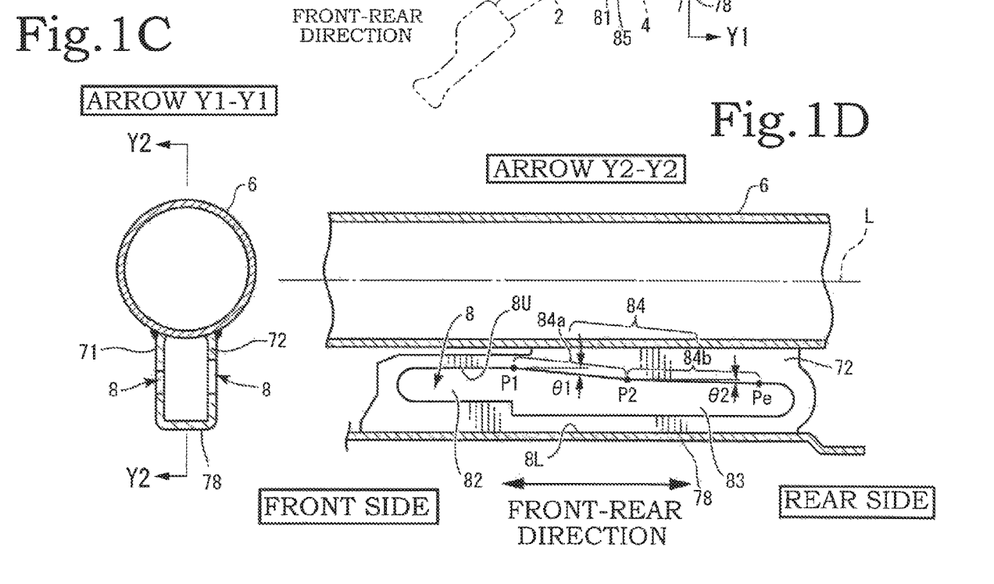
FIG. 1C is an enlarged cross-sectional view taken along arrow Y1-Y1 of FIG. 1B.
FIG. 1D is a cross-sectional view taken along arrow Y2-Y2 of FIG. 1C.

The bottom plate portion 78 is formed at lower ends of the first suspended plate-like portion 71 and the second suspended plate-like portion 72, and the cross section perpendicular to the longitudinal direction that is formed by the first suspended plate-like portion 71, the second suspended plate-like portion 72, and the bottom plate portion 78 is in the shape of substantially an inverted gate or in a square U-shape (see FIGS. 1C, 2A). The long hole portions 8, 8 are formed in the first suspended plate-like portion 71 and the second suspended plate-like portion 72 respectively. Each of the long hole portions 8 has the front-rear direction thereof as its longitudinal direction and has an upper side 8U and a lower side 8L.

A telescopic stopper 81 is formed in substantially the middle of each long hole portion 8. A telescopic long hole 82 is located at the front side with respect to the telescopic stopper 81 in the longitudinal direction, and a shock absorbing long hole 83 is located at the rear side (see FIGS. 1B, 2B). In other words, in the long hole portion 8, the telescopic stopper 81 exists at the boundary between the region of the telescopic long hole 82 and the region of the shock absorbing long hole 83, wherein the long hole portion 8 is divided into the telescopic long hole 82 and the shock absorbing long hole 83 by the telescopic stopper 81 (see FIGS. 1B, 1D, 3A).

The telescopic long hole 82 is used mainly for telescopic adjustment, and the shock absorbing long hole 83 is used mainly when the steering column moves toward the front side at the time of a secondary collision. The height dimension of each of the telescopic long holes 82 of the first suspended plate-like portion 71 and the second suspended plate-like portion 72 is larger than the diameter of the bolt shaft 51 so that the bolt shaft 51 can be inserted therethrough with slight room and can slide smoothly.

Figure 4A:
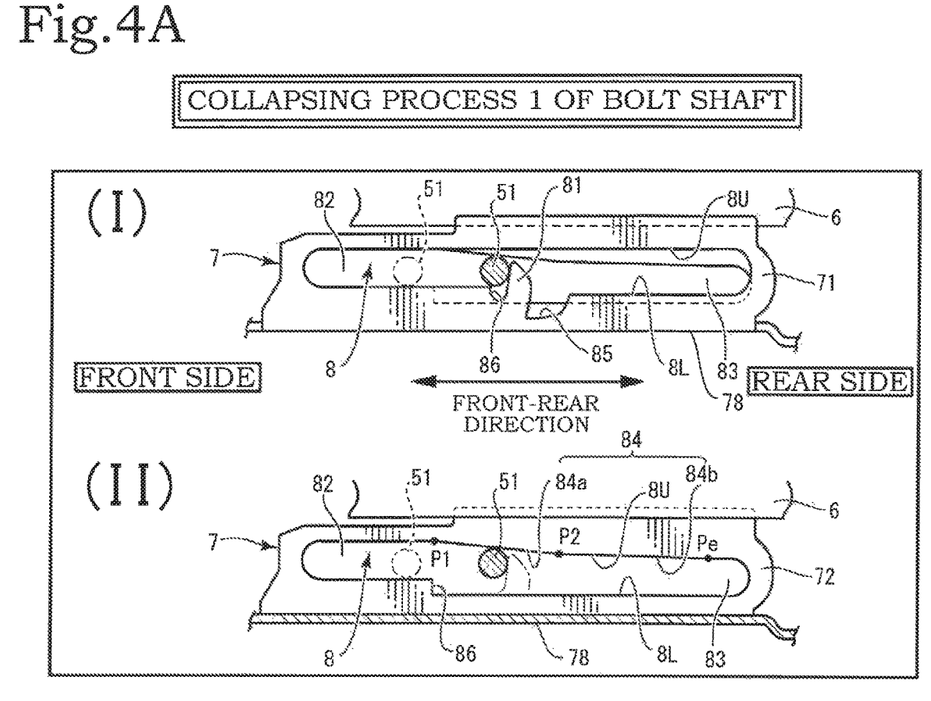
Figure 4B:
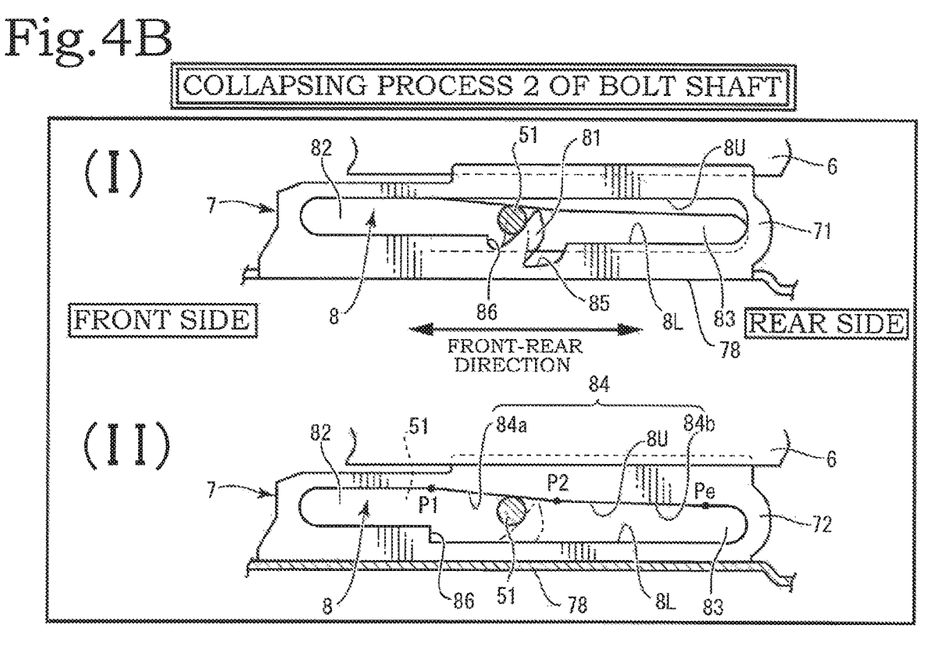
Figure 5C:
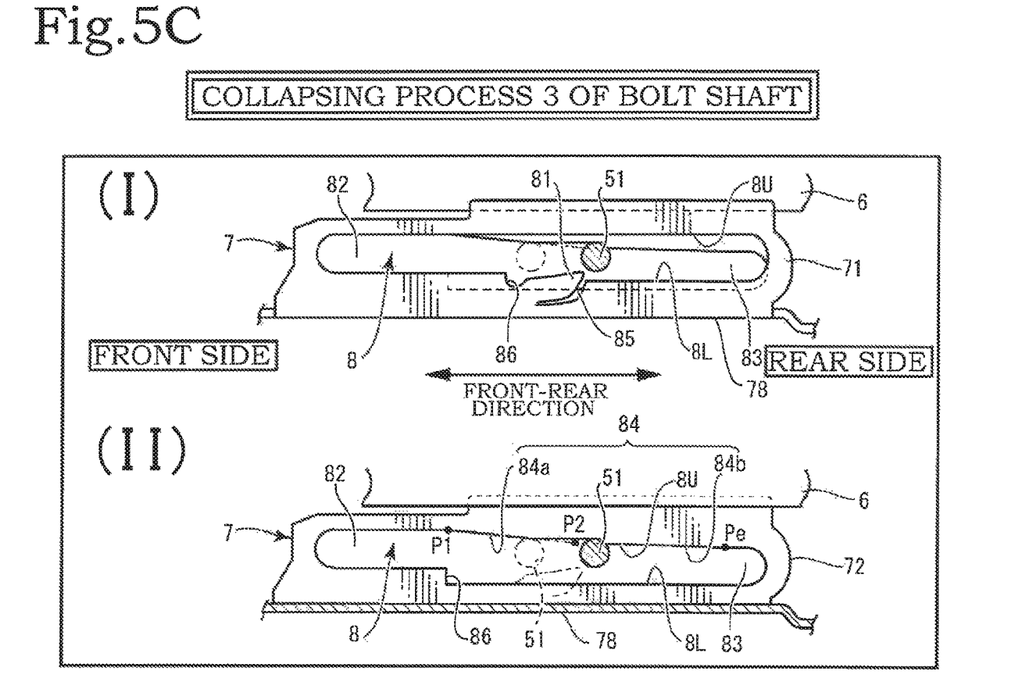
Figure 5D:
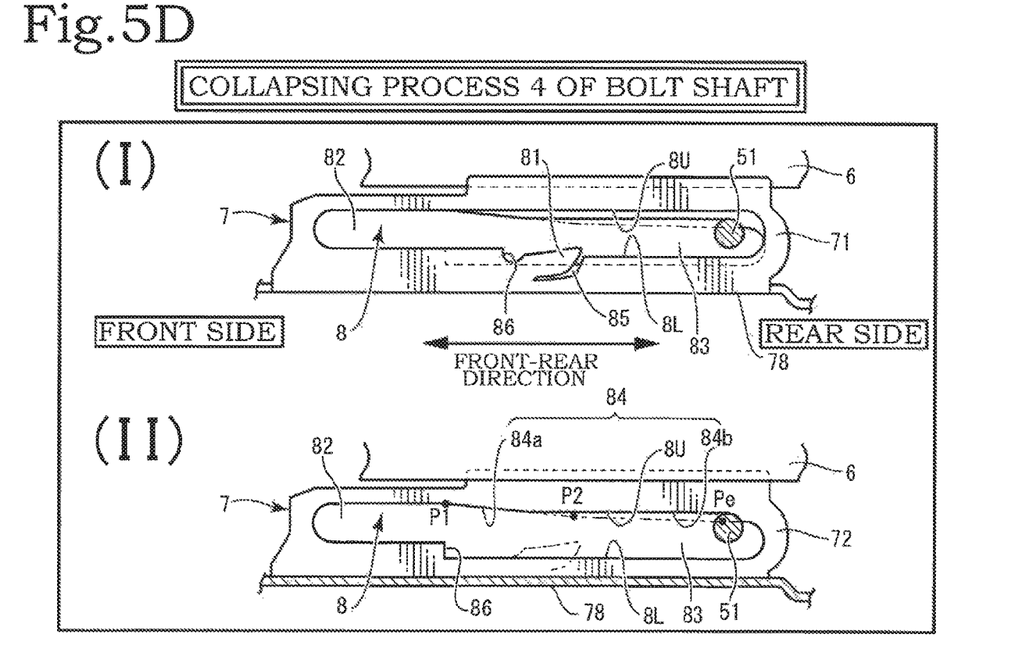

The telescopic stopper 81 is formed in the long hole portion 8 of the first suspended plate-like portion 71. The long hole portion 8 on the second suspended plate-like portion 72, on the other hand, is provided with an inclined region 84 described hereinafter. At the time of a secondary collision, the bolt shaft 51 of the tightening tool 5 collides with the telescopic stopper 81, collapsing the telescopic stopper 81 in such a manner as to push down the telescopic stopper 81 (see FIG. 4B-I, FIG. 5C-I).

Figure 3A:
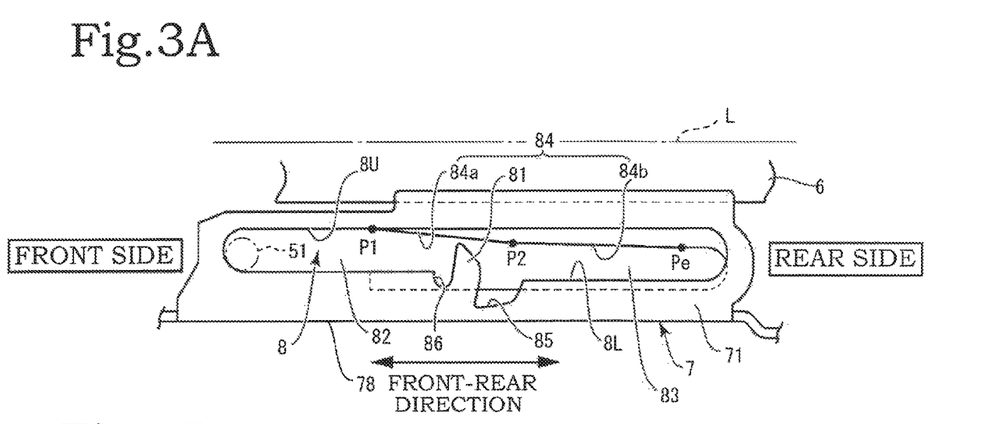
FIG. 3A is a side view of the first suspended plate-like portion of the hanger bracket according to the first embodiment of the present invention.

The telescopic stopper 81 is in the shape of a shaft or a rod and is formed in such a manner as to stretch from either the lower side 8L or the upper side 8U of the long hole portion 8 toward the other (see FIGS. 1B, 3A, and the like). It is preferred that the telescopic stopper 81 be tilted in a direction in which the protruding part thereof bends at the base of the same when the bolt shaft 51 collides therewith at the time of a secondary collision.

The telescopic stopper 81 is collapsed by the pressing force of the collision of the bolt shaft 51 in a secondary collision, and this collapsed state is where the telescopic stopper 81 falls down at the base thereof (see FIGS. 4A-I, 4A-II, 4B-I, and 4B-II and FIGS. 5C-I, 5C-II, 5D-I, and 5D-II. A recessed portion 85 for accommodating the telescopic stopper 81 when the telescopic stopper 81 falls down is formed behind the part where the telescopic stopper 81.

The recessed portion 85 has substantially the same shape as the shape of the fallen telescopic stopper 81. Therefore, when the telescopic stopper 81 falls down and is accommodated in the recessed portion 85, the front side portion of the shock absorbing long hole 83 becomes substantially flat so that the bolt shaft 51 can move smoothly and freely to the rear-side end of the shock absorbing long hole 83.

The height dimension of each shock absorbing long hole 83 is set to be larger than the height dimension of each telescopic long hole 82 due to a step portion 86 provided on the lower side 8L. After the telescopic stopper 81 is pushed down by the bolt shaft 51 and is accommodated in the recessed portion 85, the lower side 8L in the shock absorbing long hole 83 becomes even lower than the lower side 8L in the telescopic long hole 82 (see FIGS. 3A to 3C). The inclined region 84 is formed on the upper side 8U of the long hole portion 8 in the second suspended plate-like portion 72 (see FIGS. 3A to 3C).

In the following description, the telescopic stopper 81 is formed in such a manner as to protrude from the lower side 8L, and the inclined region 84 is formed near the upper side 8U. The upper side 8U and the lower side 8L outside the inclined region 84 are parallel to an axial centerline L of the column pipe 6 that extends along the front-rear direction. The inclined region 84 is formed of a plurality of inclined sides. The number of the inclined sides is two or more, and the plurality of inclined sides extend consecutively in the front-rear direction.

In the first embodiment of the present invention, the inclined region 84 is formed of two inclined sides. The two inclined sides are referred to as a first inclined side 84a and a second inclined side 84b. The first inclined side 84a is at all times located at the foremost portion of the inclined region 84 in the inclined region 84. The first inclined side 84a and the second inclined side 84b have mutually different inclination angles, the inclination angle of the first inclined side 84a being θ1 and the inclination angle of the second inclined side 84b being θ2. The inclination angle θ1 of the first inclined side 84a and the inclination angle θ2 of the second inclined side 84b are slope angles with respect to the axial centerline L extending in the front-rear direction of the column pipe 6 (see FIGS. 3A to 3C).

The position at which the first inclined side 84a of the inclined region 84 starts is referred to as a starting point P1. The position at which the second inclined side 84b starts is referred to as a starting point P2. The end point of the first inclined side 84a is the starting point P2 of the second inclined side 84b. The starting point P1 of the first inclined side 84a is located at the front side with respect to the telescopic stopper 81.

The telescopic stopper 81 is located within the range of the first inclined side 84a. In other words, the telescopic stopper 81 is located between the starting point P1 and the starting point P2 (see FIGS. 3A to 3C). In the diagram, Pe represents the terminal of the inclined region 84. In the first embodiment of the present invention, the terminal of the second inclined side 84b is the terminal Pe of the inclined region 84 (see FIGS. 3A to 3C). Within the range of the telescopic long holes 82, the bolt shaft 51 is configured to be free of interference from the first inclined side 84a.

Figures 9A, 9B:
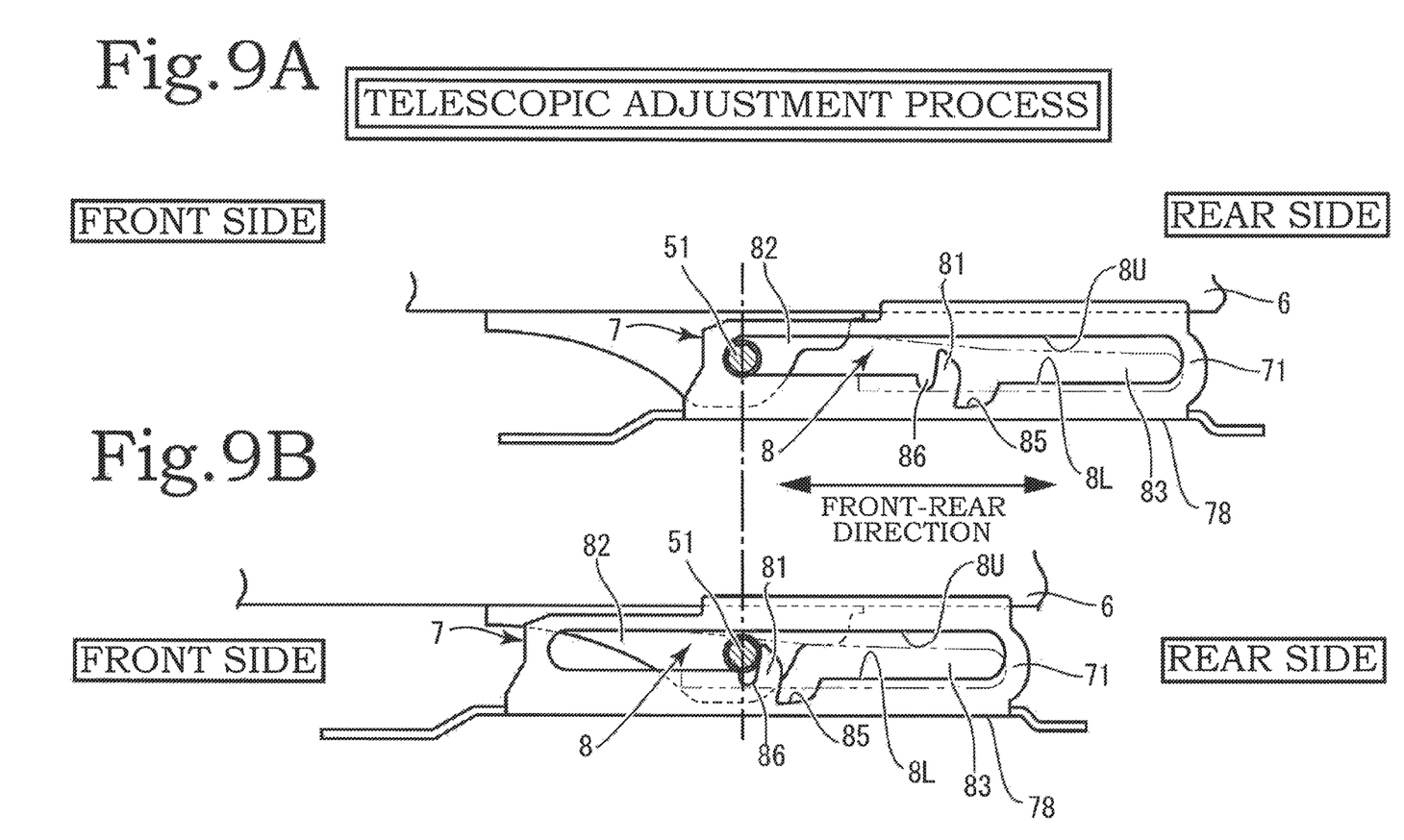
FIGS. 9A and 9B are each a side view of substantial parts, showing how the column pipe and the hanger bracket move back and forth with respect to the bolt shaft in telescopic adjustment.

In the steering device according to the present invention, at the time of telescopic adjustment, the hanger bracket 7 with the telescopic long holes 82 moves back and forth together with the column pipe 6 with respect to the bolt shaft 51 (see FIGS. 9A and 9B). In other words, the bolt shaft 51 and the telescopic long holes 82 move relatively in the front-rear direction. Specifically, it can be said that the bolt shaft 51 relatively slides inside the telescopic long holes 82 in the front-rear direction.

Then, at the time of telescopic adjustment, once the hanger bracket 7 moves farthest to the front side together with the column pipe 6, the bolt shaft 51 comes into abutment with the front edge of the telescopic stopper 81, wherein the bolt shaft 51 is not interfered by the first inclined side 84a of the inclined region 84. The bolt shaft 51 not being interfered by the first inclined side 84a means that the bolt shaft 51 is not subjected to a pressure load of the first inclined side 84a because the bolt shaft 51 does not come into abutment with the first inclined side 84a before coming into abutment with the telescopic stopper 81.

The bolt shaft 51 starts to collapse the first inclined side 84a by coming into abutment with the first inclined side 84a, after starting to push down and collapse the telescopic stopper 81 at the time of a secondary collision. Specifically, the bolt shaft 51 comes into abutment with the first inclined side 84a in the process of pushing down the telescopic stopper 81 rearward, that is, in the collapsing process, and starts to collapse the first inclined side 84a. In the collapsing process in which the bolt shaft 51 pushes down the telescopic stopper 81 at the time of a secondary collision, shock absorption also takes place by collapsing the first inclined side 84a. As a result, the shock absorption load can be sustained and prevented from dropping after the telescopic stopper 81 is collapsed.

Figure 3B:
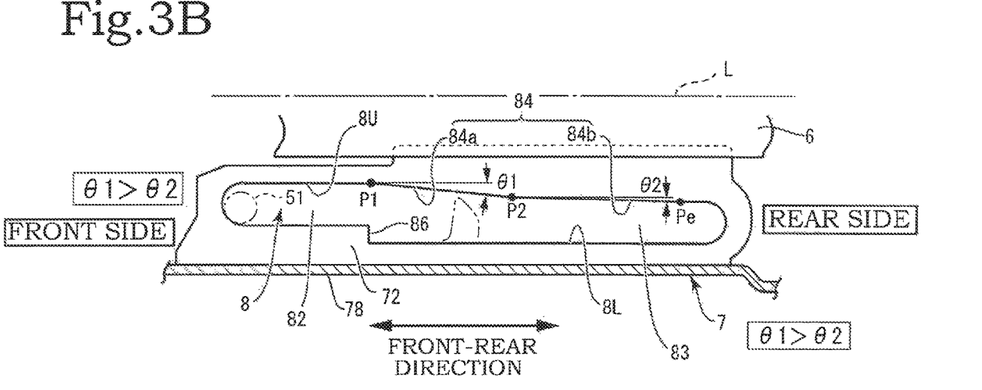
FIG. 3B is a side view of the second suspended plate-like portion of the hanger bracket according to the first embodiment of the present invention.

As described above, the second inclined side 84b is formed in a consecutive manner at the rear side with respect to the first inclined side 84a, and the inclination angle θ2 of the second inclined side 84b is made smaller than the inclination angle θ1 of the first inclined side 84a (see FIG. 3B).

Specifically, θ1>θ2 is established.

Figure 3C:
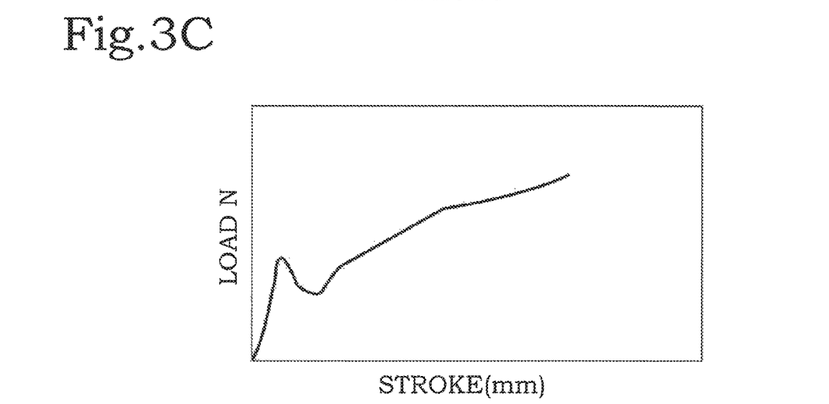
FIG. 3C is a graph showing the relationship between strokes and loads in shock absorption during a secondary collision, according to the first embodiment of the present invention.

In the first embodiment, the inclination of the second inclined side 84b is gentler than that of the first inclined side 84a. In a secondary collision, the shock absorption load increases significantly and then slowly, while the collapsing load of the telescopic stopper 81 is maintained. FIG. 3C is a graph showing the relationship between strokes and loads in shock absorption during a secondary collision, according to the first embodiment of the present invention.

Figure 6A:
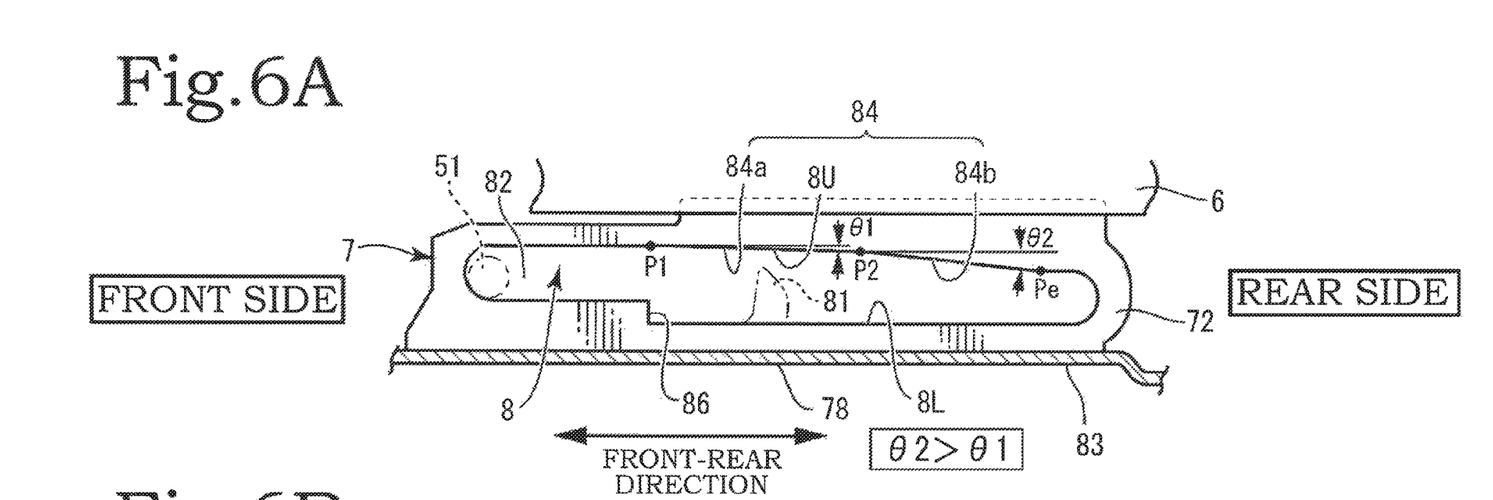
FIG. 6A is a side view of a second suspended plate-like portion of a hanger bracket according to a modification of the first embodiment of the present invention.

As a modification of the first embodiment, the inclination angle θ2 of the second inclined side 84b may be made larger than the inclination angle θ1 of the first inclined side 84a (see FIG. 6A).

Specifically, θ2>θ1 may be established.

Figure 6B:
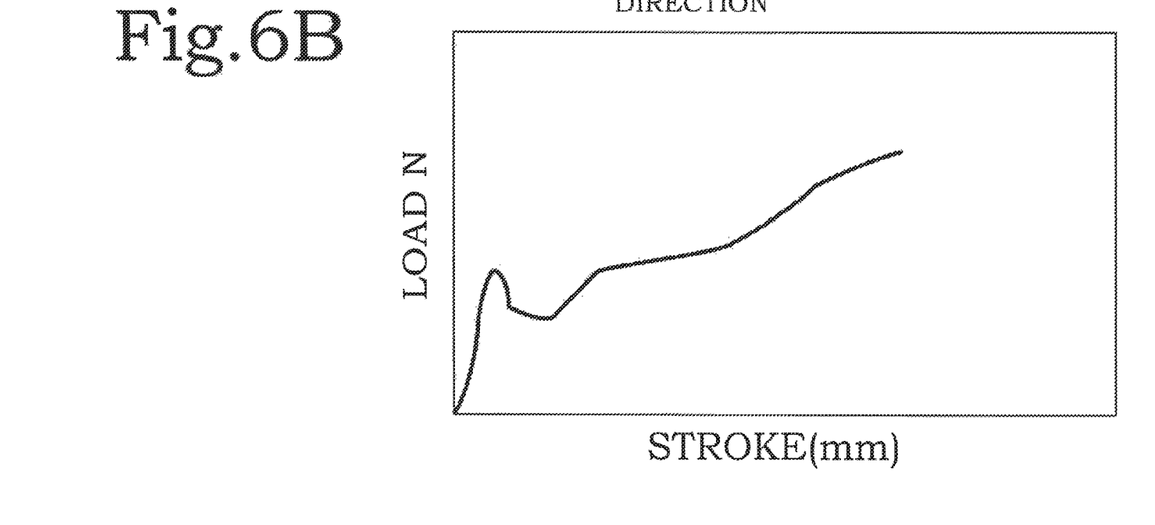
FIG. 6B is a graph showing the relationship between strokes and loads in shock absorption during a secondary collision, according to the modification of the first embodiment of the present invention.

In the modification of the first embodiment, the inclination of the first inclined side 84a is gentler than that of the second inclined side 84b. In a secondary collision, the shock absorption load increases slowly and then significantly, while the collapsing load of the telescopic stopper 81 is maintained. FIG. 6B is a graph showing the relationship between strokes and loads in shock absorption during a secondary collision, according to the modification of the first embodiment of the present invention.

Figure 7A:
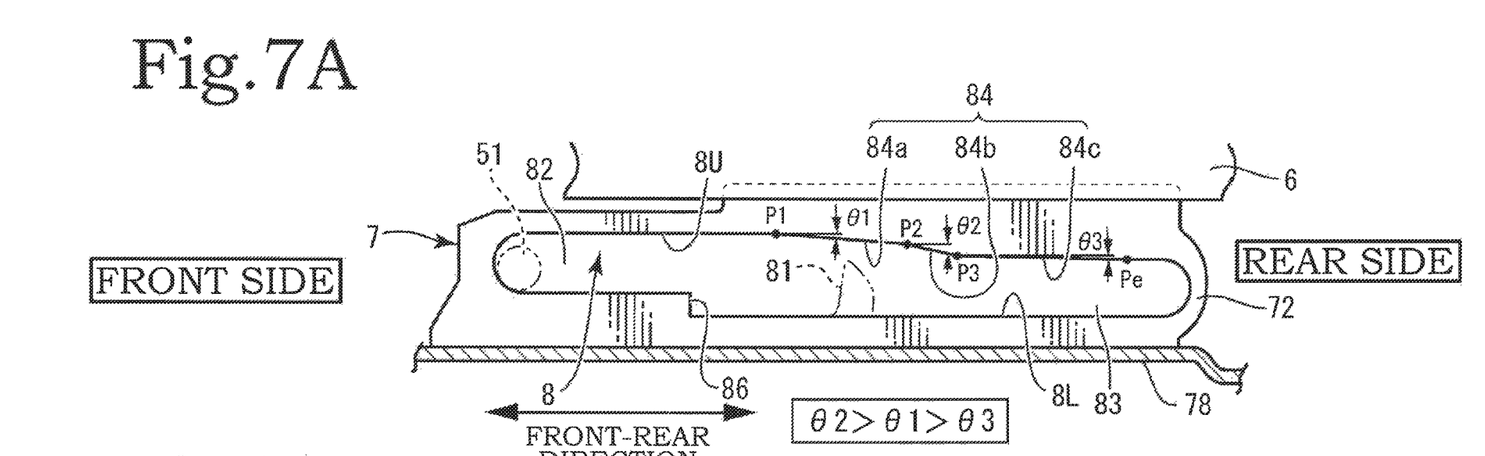
FIG. 7A is a side view of the second suspended plate-like portion of the hanger bracket according to the second embodiment of the present invention.

The second embodiment of the present invention is described next. The inclined region 84 is formed of three inclined sides (see FIG. 7A). The three inclined sides are the first inclined side 84a and the second inclined side 84b described in the first embodiment, as well as a third inclined side 84c. In the second embodiment as well, the first inclined side 84a is located at the foremost portion of the inclined region 84.

The first inclined side 84a, the second inclined side 84b, and the third inclined side 84c have inclination angles different from one another. The inclination angle of the third inclined side 84c is θ3. As with the inclination angles θ1, θ2 described above, the inclination angle θ3 of the third inclined side 84c is a slope angle with respect to the axial centerline L extending in the front-rear direction of the column pipe 6. The position at which the third inclined side 84c starts is referred to as a starting point P3. Specifically, the end point of the second inclined side 84b is the starting point P3 of the third inclined side 84c.

As with the first embodiment, in the second embodiment, the starting point P1 of the first inclined side 84a is located at the front side with respect to the telescopic stopper 81, the telescopic stopper 81 being located within the range of the first inclined side 84a. The conditions for configuring the first inclined side 84a in the second embodiment are the same as those of the first inclined side 84a in the first embodiment. The magnitude relationship among the inclination angle θ1 of the first inclined side 84a, the inclination angle θ2 of the second inclined side 84b, and the inclination angle θ3 of the third inclined side 84c is preferably such that the inclination angle θ2 of the second inclined side 84b is set to be the largest and the inclination angle θ3 of the third inclined side 84c is set to be the smallest (see FIG. 7A). Specifically, θ2>θ1>θ3 is established.

Figure 7B:
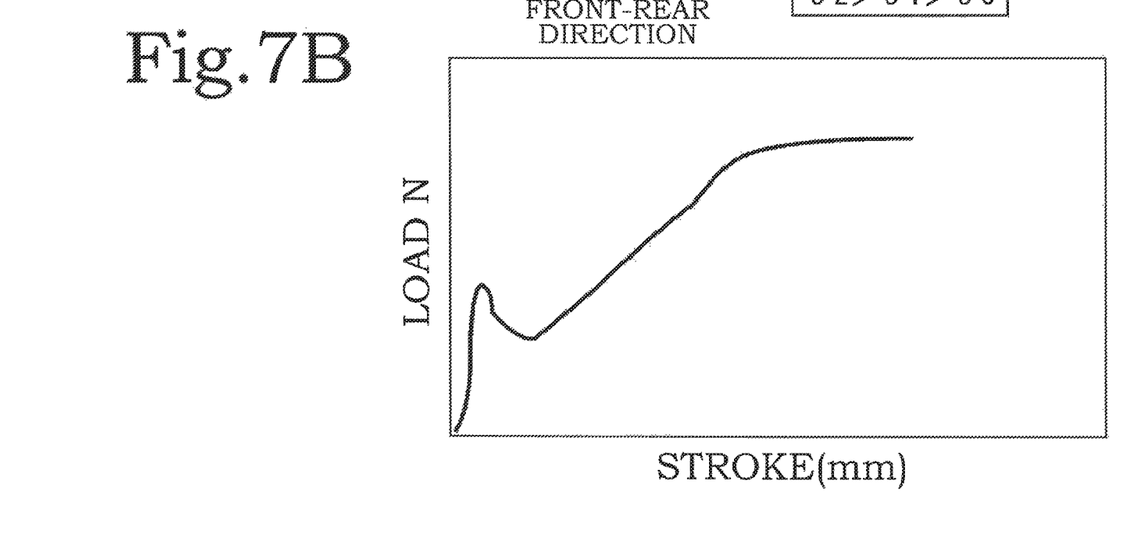
FIG. 7B is a graph showing the relationship between strokes and loads in shock absorption during a secondary collision, according to the second embodiment of the present invention.

FIG. 7B is a graph showing the relationship between stroke and loads in shock absorption during a secondary collision, according to the second embodiment. The second embodiment includes a situation in which at least two of the inclination angles of the three inclined sides, that is, the first inclined side 84a, the second inclined side 84b, and the third inclined side 84c, are different. Specifically, in some cases the inclination angle θ1 of the first inclined side 84a and the inclination angle θ3 of the third inclined side 84c are set to be equal to each other, the first inclined side 84a and the third inclined side 84c being formed in a non-consecutive manner in the front-rear direction.

In addition, an embodiment is possible in which the inclined region 84 is formed of four or more inclined sides. Specifically, the inclined region 84 is formed of the first inclined side 84a, the second inclined side 84b, the third inclined side 84c, . . . and the nth inclined side 84x. The n is a positive integer and collectively refers to the inclined side located at the farthest end in the front-rear direction.

Figure 8A:
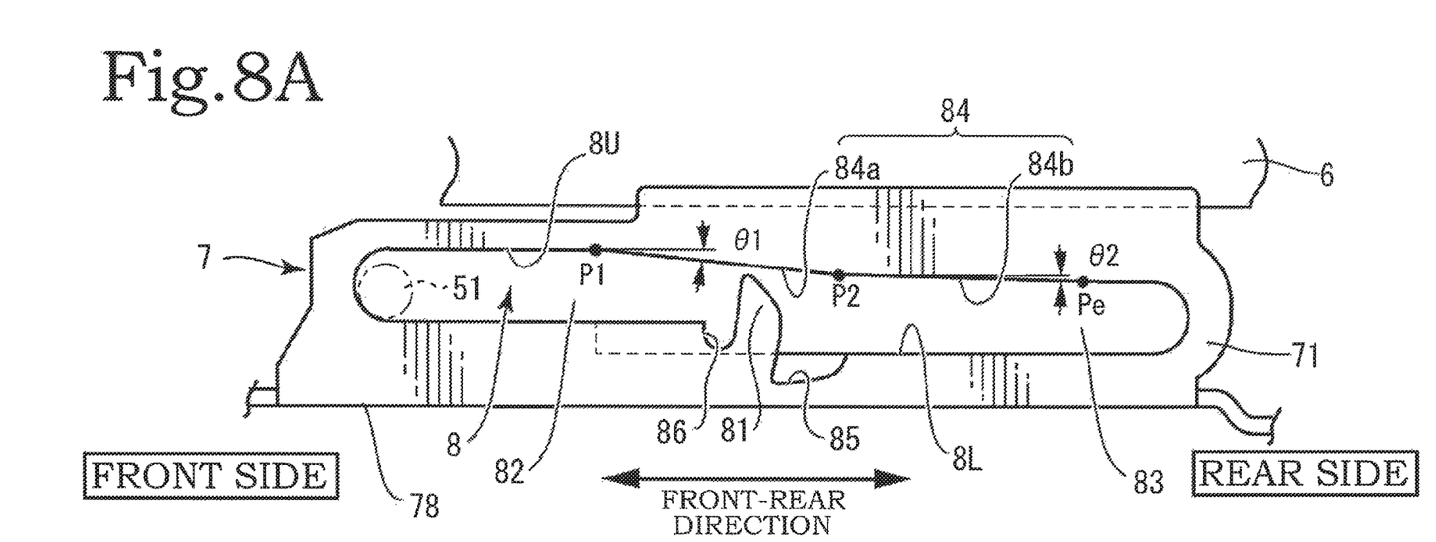
FIG. 8A is a side view of the first suspended plate-like portion of the hanger bracket according to the third embodiment of the present invention.
Figure 8B:
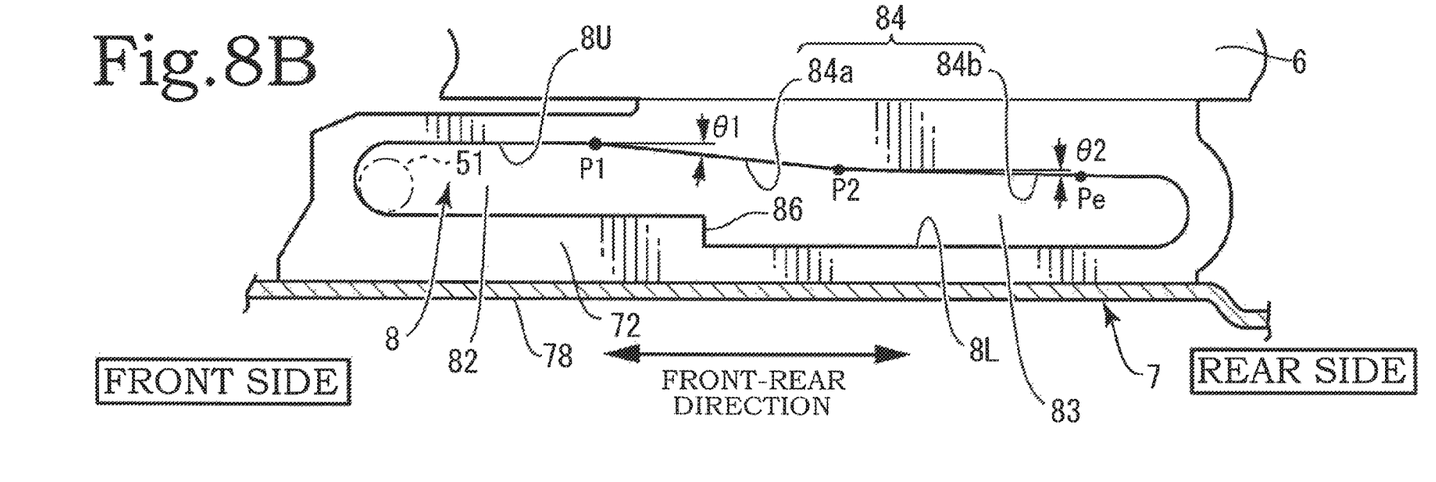
FIG. 8B is a side view of the second suspended plate-like portion of the hanger bracket according to the third embodiment of the present invention.

In the third embodiment of the present invention, the inclined regions 84 are formed in the respective long hole portions 8 of the first suspended plate-like portion 71 and the second suspended plate-like portion 72 of the hanger bracket 7 (see FIGS. 8A and 8B). Specifically, the long hole portions 8, 8 of an identical shape are formed in the first suspended plate-like portion 71 and the second suspended plate-like portion 72 respectively. The telescopic stopper 81 is formed only in the first suspended plate-like portion 71, but may be formed in each of the first and second suspended plate-like portions 71 and 72.

Assembly of the main components of the present invention is described next. The column pipe 6 is enclosed in the enclosing inner peripheral side surface portion 1a of the enclosing main body portion 1 of the outer column A. The hanger bracket 7 that is fixed firmly to the column pipe 6 is disposed between the tightening portions 2, 2 of the outer column A. The tightening portions 2, 2 of the outer column A are sandwiched between the fixed side portions 41, 41 of the fixed bracket 4, and the bolt shaft 51 of the tightening tool 5 passes through the adjustment holes 43, 43 of the fixed side portions 41, 41, the tightening through-holes 22, 22 formed in the tightening portions 2, 2, and the telescopic long holes 82 of the hanger bracket 7, and mounted together with the lock lever portion 52 and the tightening cam 53 by the nut 54 (see FIG. 2A).

An operation of turning the lock lever portion 52 causes the tightening cam 53 to push the tightening portions 2, 2 via the fixed side portions 41, 41 of the fixed bracket 4, and then both the tightening cam 53 and the tightening portions 2, 2 are tightened together by the tightening tool 5.

Consequently, the gap between the slit portions 11 of the enclosing main body portion 1 of the outer column A becomes narrow, thereby axially locking (fixing) the column pipe 6 mounted in the outer column A.

The hanger bracket 7 is disposed between the tightening portions 2, 2 of the outer column A. When tightening the outer column A using the tightening tool 5, the tightening portions 2, 2 come close to each other, but the hanger bracket 7 separates from the tightening portions 2, 2 (see FIG. 2A). Therefore, even when tightening the outer column A using the tightening tool 5, the tightening portions 2, 2 are not in contact with the first suspended plate-like portion 71 and the second suspended plate-like portion 72 of the hanger bracket 7; the shock absorption operation is not interrupted.

The operations performed in a secondary collision are described next. The following description is based on the configuration of the first embodiment of the present invention. As a result of a secondary collision, first, the bolt shaft 51 of the tightening tool 5 relatively collides with the telescopic stopper 81 provided in the first suspended plate-like portion 71, starting the first shock absorption in the secondary collision (see FIG. 4A-I). At the moment when the bolt shaft 51 collides with the telescopic stopper 81, the bolt shaft 51 is not in abutment with the first inclined side 84a yet (see FIG. 4A-II).

Specifically, at the moment of the secondary collision, the shock is absorbed only by the bolt shaft 51 and the telescopic stopper 81. However, because the starting point P1 of the first inclined side 84a is located at the front side with respect to the telescopic stopper 81, the bolt shaft 51 and the first inclined side 84a are about to come close to each other by the time when the bolt shaft 51 passes the starting point P1 of the first inclined side 84a to come into abutment with the telescopic stopper 81 (see FIG. 4A-II).

In the collapsing process in which the bolt shaft 51 pushes down the telescopic stopper 81 rearward to absorb the shock (see FIG. 4B-I), the bolt shaft 51 starts to collapse the first inclined side 84a, so the shock absorption operation is performed between the bolt shaft 51 and the first inclined side 84a as well (see FIG. 4B-II). Specifically, the shock absorption operation is performed by the pair of the bolt shaft 51 and the telescopic stopper 81, and the pair of the bolt shaft 51 and the first inclined side 84a. This process is the first half of the shock absorption operation performed when a secondary collision occurs.

Next, as the bolt shaft 51 continues to move relatively at the rear side of the shock absorbing long holes 83, the bolt shaft 51 reaches the starting point P2 of the second inclined side 84b from the first inclined side 84a and starts to collapse the second inclined side 84b (see FIGS. 5C-I and 5C-II). The bolt shaft 51 further moves relatively to the terminal Pe of the second inclined side 84b, performing the second half of the shock absorption operation (see FIGS. 5D-I and 5D-II).

The present invention has a main configuration in which the telescopic stopper 81 is provided in at least one of the long hole portions 8, the inclined region 84 which is formed of a plurality of consecutive inclined sides and the vertical size of which gradually becomes narrow is provided on the other long hole portion 8, and the starting point P1 of the inclined region 84 is located at the front side with respect to the telescopic stopper 81.

According to this configuration, at the time of a secondary collision, the bolt shaft 51 of the tightening tool 5 comes into abutment with the inclined region 84 during the process of collapsing the telescopic stopper 81 and relatively moves toward the rear side while collapsing the inclined region 84, thereby generating a collapsing load of the inclined region, and consequently the shock absorption load of the secondary collision can be sustained.

In addition, the inclined region 84 is formed of the plurality of consecutive inclined sides (the first inclined side 84a, the second inclined side 84b, the third inclined side 84c, etc.). By setting mutually different inclination angles for the plurality of inclined sides, the resistance load that is generated by collapsing by the bolt shaft 51 can be changed in accordance with the angles, and the shock absorption load of the secondary collision can be adjusted accordingly.

The second embodiment has a configuration in which the inclined region has the first inclined side and the second inclined side located at the rear side with respect to the first inclined side, and the first inclined side has an inclination angle larger than that of the second inclined side. According to this configuration, in a secondary collision, the collapsing load on the first inclined side that is generated in the process of collapsing the telescopic stopper with the bolt shaft can be made significant, and thereafter slow shock absorption can be performed.

In the third embodiment, the inclination angle of the second inclined side is larger than that of the first inclined side. Thus, in a secondary collision, the collapsing load on the first inclined side that is generated in the process of collapsing the telescopic stopper with the bolt shaft can be made small, and thereafter strong shock absorption can be performed gradually. Specifically, shock absorption in the second half of a secondary collision is carried out relatively slowly without significantly reducing the initial load generated in the secondary collision.

In the fourth embodiment, the inclined region has the first inclined side, the second inclined side located at the rear side with respect to the first inclined side, and the third inclined side located at the rear side with respect to the second inclined side, and the angles of the first inclined side, the second inclined side, and the third inclined side are different from one another. According to this configuration, finer load adjustment can be achieved in the shock absorption process at the time of a secondary collision.

In the fifth embodiment, the second inclined side has the largest angle and the third inclined side is set to have the smallest angle. Such a configuration can achieve a shock absorption process that keeps a high load. The sixth embodiment is a steering device in which the inclined regions are formed in both the first suspended plate-like portion and the second suspended plate-like portion. In this steering device, the loads generated in the shock absorption process in secondary collision can be set large.

What is claimed is:

1. A steering device, comprising:
    a column pipe;
    a hanger bracket having a first suspended plate portion and a second suspended plate portion and fixed firmly to the column pipe;
    an outer column having an enclosing main body portion enclosing the column pipe and a tightening portion;
    a fixed bracket supporting the outer column; and
    a tightening tool that tightens and loosens the outer column and the fixed bracket and has a bolt shaft collapsing a telescopic stopper at a time of a secondary collision,
    wherein long hole portions that extend in an axial direction and are each formed of a telescopic long hole and a shock absorbing long hole are formed in the first suspended plate portion and the second suspended plate portion respectively, the telescopic stopper is provided in one of the long hole portions, an inclined region which is formed of a plurality of consecutive inclined sides and a vertical size of which gradually becomes narrow is provided in the other long hole portion, and a starting point of the inclined region is located at the front side with respect to the telescopic stopper.

2. The steering device according to claim 1, wherein the inclined region has a first inclined side and a second inclined side located at the rear side with respect to the first inclined side, the first inclined side having an inclination angle larger than that of the second inclined side.

3. The steering device according to claim 2, wherein the inclined regions are formed in the first suspended plate portion and the second suspended plate portion respectively.

4. The steering device according to claim 1, wherein the inclined region has a first inclined side and a second inclined side located at the rear side with respect to the first inclined side, the second inclined side having an inclination angle larger than that of the first inclined side.

5. The steering device according to claim 1, wherein the inclined region has a first inclined side, a second inclined side located at the rear side with respect to the first inclined side, and a third inclined side located at the rear side with respect to the second inclined side, the first inclined side, the second inclined side, and the third inclined side having angles different from one another.

6. The steering device according to claim 5, wherein the second inclined side has the largest angle and the third inclined side is set to have the smallest angle.

7. The steering device according to claim 1, wherein the inclined regions are formed in the first suspended plate portion and the second suspended plate portion respectively.

* * * * *